UNITED STATES PATENT OFFICE.

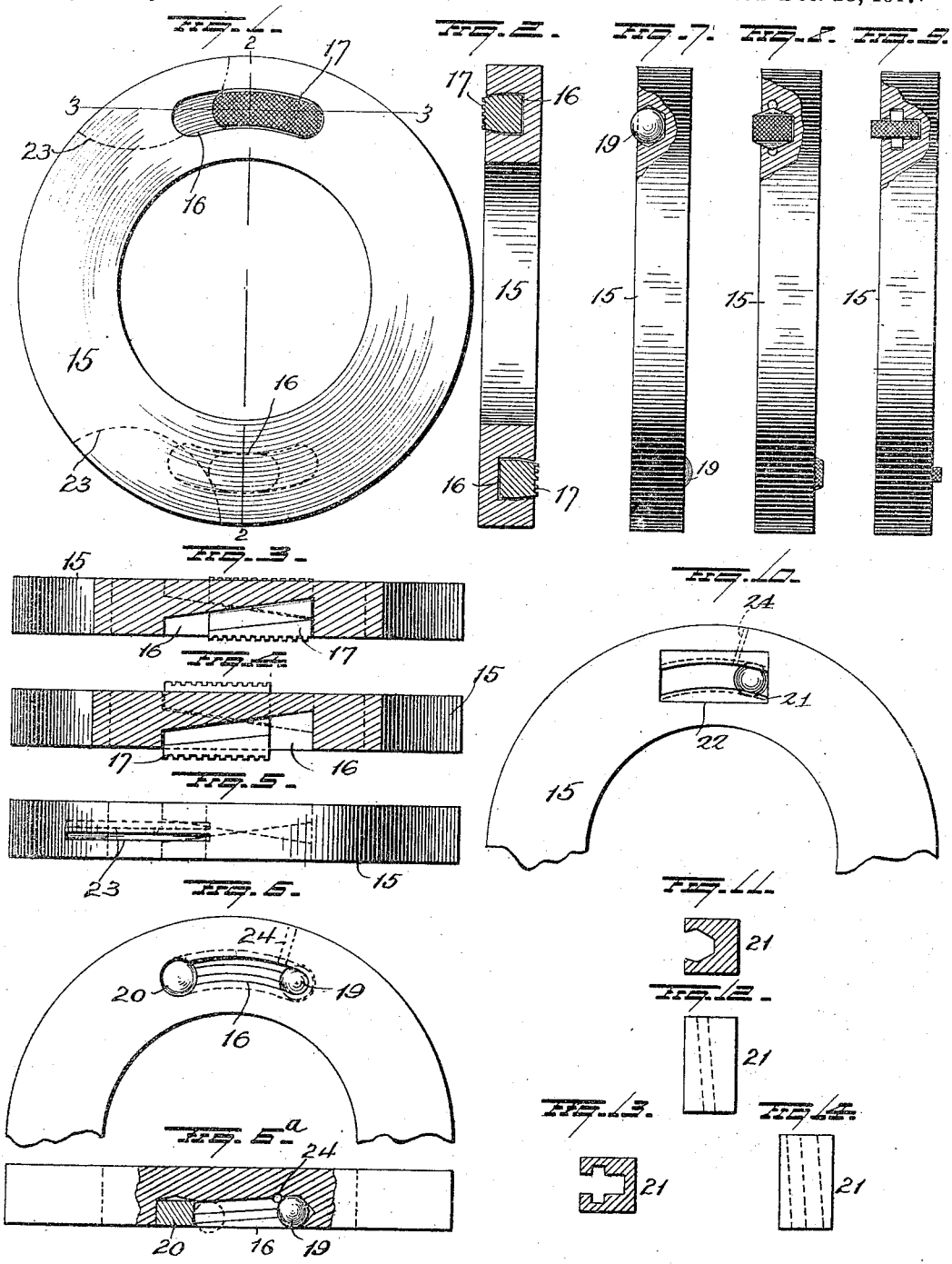

BENJAMIN E. D. STAFFORD AND ETHAN I. DODDS, OF PITTSBURGH, PENNSYLVANIA, ASSIGNORS TO FLANNERY BOLT COMPANY, OF PITTSBURGH, PENNSYLVANIA.

WASHER.

1,250,241.　　　　Specification of Letters Patent.　　Patented Dec. 18, 1917.

Application filed February 18, 1916. Serial No. 79,124.

*To all whom it may concern:*

Be it known that we, BENJAMIN E. D. STAFFORD and ETHAN I. DODDS, citizens of the United States, and residents of Pittsburgh, in the county of Allegheny and State of Pennsylvania, have invented certain new and useful Improvements in Washers; and we do hereby declare the following to be a full, clear, and exact description of the invention, such as will enable others skilled in the art to which it appertains to make and use the same.

Our invention relates to an improvement in washers designed for locking nuts to bolts, and it consists in the details of construction as will be more fully explained and pointed out in the claims.

In the accompanying drawings, Figure 1 is a view in elevation of a washer or disk embodying our invention; Fig. 2 is a view in cross section on the line 2—2 of Fig. 1; Fig. 3 is a view in section on the line 3—3 of Fig. 1; Fig. 4 is a similar view showing the wedge in its other extreme; Fig. 5 is an edge view of the washer and Figs. 6 to 14 inclusive are views of modified forms.

15 represents a washer provided with a central opening for the passage of a bolt, and in its opposite faces and at opposite sides of its central opening with slots 16 which are preferably concentric with the center of the washer. These slots have inclined floors on which the wedges 17 slide, and the slots and wedges are so proportioned that the outer biting faces of the latter are parallel with the outer faces of the washer and remain so throughout the entire movements of the wedges, and when the wedges are at the deeper ends of their slots they project slightly beyond the washer sufficiently to engage the adjacent face of the nut and face of the fish plate, or other part against which the washer may bear. The inclination of the floors of the slots and the wedges therein, are such that contact with the nut while the latter is being screwed onto the bolt, will move and hold the wedges at the deeper ends of the slots, and when the nut is properly secured on the bolt, the washer will be compressed between the nut and fish plate or other part, with the biting faces of the wedges in direct contact with said parts, so that any force tending to unscrew the nut, will cause the wedges to ride up on their inclined floors and thus bind and hold the washer from movement, and the nut from any releasing movement on the bolt. The greater the force tending to release or unscrew the nut, the tighter the binding action of the wedges, hence in order to release the nut, sufficient power must be applied to the nut to crush the wedge, or provision made, as will hereinafter be described, for holding the wedges against clamping movement when it is desired to release the nut.

The wedges 17 are curved to conform to the curvature of the slots and are preferably inclined at their bases, as shown in Fig. 2, and after they have been placed in position, are locked within the slots by upsetting the metal of the washer over the sides of the wedges, leaving the latter free to move longitudinally in their slots but locking them against displacement.

Instead of making the clamping devices of wedge shape, they may be in the form of balls or spheres 19 as shown in Figs. 6 and 7, or as cylinders or rollers as in Figs. 8 and 9.

When balls or spheres are used as shown in Figs. 6 and 7, we prefer to enlarge the slot at its shallow end sufficiently to take in the ball, and after the latter has been moved into the slot, the side walls of which are so shaped to hold the ball in place as shown in Fig. 7 it is locked therein by a plug 20 wedged or otherwise secured in the enlargement of the slot.

Instead of the balls, rollers such as are shown in Figs. 8 and 9 may be used. In both of these latter instances the trunnions of the rollers rest and move in inclined ways formed in the disk, and we prefer to introduce them through enlargements at the end of the slot disclosed in Fig. 6. Where the slot is enlarged to permit of the insertion of the ball or roller, the enlargement is closed by a plug 20 as heretofore explained.

Instead of forming the slot directly in the washer, as explained above, it may be formed in a separate hard metal block 21 as shown in Figs. 10 to 14 inclusive. With this latter construction the ball or roller is inserted in the slot in the block 21, after which the latter is placed within a recess 22 in the washer, and secured therein.

In all the forms above referred to the clamping or locking means project slightly beyond the opposite faces of the washer, so that when the nut is screwed home one of the clamping members will bear against the rear face of the nut and the other against the adjacent face of the fish plate or their part against which the washer bears and the tighter the nut is screwed up, the tighter the locking action of the clamping device. The nut is free to screw on the bolt, but the contact between the parts is such that any tendency of the nut to turn in the reverse direction causes the locking devices to move outwardly on their inclined bearings and bear with gradually increasing pressure against the nut and also against the fish plate, thus not only forcing the washer outwardly against the nut, but absolutely preventing either the nut or washer from turning in a direction to unscrew the nut.

If desired the washer may be kerfed as at 23, (shown in Fig. 5) for the insertion of a wire or other device for holding the wedges or other clamping devices in the deeper ends of the slots, or it may be provided with a hole as at 24, Fig. 6, for the insertion of a wire nail or other plug for locking the clamping device against movement up the incline.

These washers are particularly designed for use with track bolts or bolts of large diameter, when it is necessary to lock the bolts against turning movement, but we would have it understood that it is equally applicable for bolts of all kinds and sizes.

Having fully described our invention what we claim as new and desire to secure by Letters-Patent, is:—

1. A washer having a slot in each face, the said slots being located on opposite sides of the central opening in the washer and curved concentric with said opening and each having an inclined bearing, and a clamping device permanently secured in each slot and having a movement lengthwise the slot on the inclined bearing of the latter.

2. A washer having a recess, a block adapted to be secured within said recess and having a longitudinal slot and an inclined support within the slot for a clamping member, and a clamping member secured within the slot and movable lengthwise the latter.

3. A washer having a slot in one face, the said slot being curved concentric with said opening and having an inclined bearing and an opening through the edge of the washer and leading to the slot, and a clamping device located within the slot and movable on said inclined bearing and adapted to be retained at the deeper end of the latter by an instrument inserted through the opening in the edge of the washer and engaging the clamping device.

In testimony whereof, we have signed this specification in the presence of two subscribing witnesses.

BENJAMIN E. D. STAFFORD.
ETHAN I. DODDS.

Witnesses:
EDWIN S. RYCE,
F. H. ALLISON.

Copies of this patent may be obtained for five cents each, by addressing the "Commissioner of Patents, Washington, D. C."